United States Patent [19]

Bakx

[11] Patent Number: 5,363,361

[45] Date of Patent: Nov. 8, 1994

[54] INFORMATION RECORDING DEVICE HAVING VARIABLE DATA TRANSFER RATES AND VERIFICATION OF RECORDING QUALITY

[75] Inventor: Johannes L. Bakx, Eindhoven, Netherlands

[73] Assignee: U.S. Philips Corporation, New York, N.Y.

[21] Appl. No.: 952,027

[22] Filed: Sep. 28, 1992

[30] Foreign Application Priority Data

Mar. 4, 1992 [NL] Netherlands ............... 9200397

[51] Int. Cl.$^5$ ................................... G11B 3/90
[52] U.S. Cl. ........................... 369/54; 369/32; 369/58
[58] Field of Search ............... 369/54, 58, 59; 360/53, 360/51; 364/280.8, 281.3

[56] References Cited

U.S. PATENT DOCUMENTS

| 4,665,513 | 5/1987 | Wengler | 369/54 |
|---|---|---|---|
| 4,814,903 | 3/1989 | Kulakowski et al. | 369/59 |
| 4,872,073 | 10/1989 | Fincher et al. | 360/51 |
| 4,941,139 | 7/1990 | Kulakowski et al. | 369/54 |
| 4,988,277 | 12/1984 | McFarlane et al. | 369/58 |

FOREIGN PATENT DOCUMENTS

| 0325329 | 7/1989 | European Pat. Off. . |
|---|---|---|
| 0404205 | 12/1990 | European Pat. Off. . |
| 0404247 | 12/1990 | European Pat. Off. . |
| 0404251 | 12/1990 | European Pat. Off. . |
| 0429139 | 5/1991 | European Pat. Off. . |
| 0442506 | 8/1991 | European Pat. Off. . |
| 0442566 | 8/1991 | European Pat. Off. . |
| 0463183 | 1/1992 | European Pat. Off. . |
| 0464216 | 1/1992 | European Pat. Off. . |
| 0465053 | 1/1992 | European Pat. Off. . |
| 9109399 | 6/1991 | Germany . |

OTHER PUBLICATIONS

A page from a Search Report dated Nov. 19, 1992.

Primary Examiner—Aristotelis Psitos
Assistant Examiner—Duncan Wilkinson
Attorney, Agent, or Firm—Leroy Eason

[57] ABSTRACT

An information recording device for recording digital information at a higher bit rate than that at which it is received. The difference in bit rate is compensated by an input buffer memory, read-out of a packet of information stored therein and recording thereof being periodically interrupted so as to maintain the filling level within a predetermined range. During each recording interruption, the recorded information pattern corresponding to the last recorded packet of information is read-out from the record carrier and the read-out signal is analyzed by an analysis circuit to derive an indication signal indicative of recording quality. The indication signal can be used to optimize the write parameters of the recording device, and also to determine whether re-recording of any or all of the last already recorded information packet should be performed before resuming read-out and recording of subsequent information packets from the buffer memory.

5 Claims, 4 Drawing Sheets

INFORMATION RECORDING DEVICE HAVING VARIABLE DATA TRANSFER RATES AND VERIFICATION OF RECORDING QUALITY

BACKGROUND OF THE INVENTION

1. Field of the Invention

The invention relates to a device for recording information on a record carrier, which device comprises a read/write head of a type which can be brought to either of a read state and a write state. In the write state, in response to a write signal a corresponding information pattern is written in a portion of the record carrier which is scanned by a scanning point determined by the position of the read/write head. In the read state, a read signal is produced indicative of the information pattern in the portion of the record carrier then being scanned by the scanning point. The device also comprises a driving means for causing the scanning point to scan the record carrier along a track-shaped path, an input buffer memory for storing information to be recorded and which is supplied thereto at a given load rate, a retrieval circuit for retrieving a packet of information from the input buffer memory at a retrieval rate which is higher than the load rate, a write circuit for converting the packet of information into write signals for the read/write head, and control means for interrupting the recording operation after the information pattern corresponding to said packet has been recorded. The control also causes a repeated scanning of the information pattern corresponding to the last retrieved packet and for retrieving a subsequent packet of information from the input buffer memory, and starts the recording of an information pattern corresponding to said subsequent packet in a portion of the record carrier adjoining the last recorded information pattern, such that a filling level of the input buffer memory remains between given limits.

2. Description of the Related Art

A device of this type is known from EP-A 0,429,139, which corresponds to U.S. Pat. No. 5,212,678, issued May 18, 1993, assigned to the present assignee. However, a requirement for recording information is that the recorded information pattern be of satisfactory quality to enable reliable reading. Due to parameter variations or incidental disturbances during the write process, a portion of the recorded information may not be of such quality and so may only be partly readable.

SUMMARY OF THE INVENTION

It is an object of the invention to provide means by which the recording quality can be monitored during recording.

For a recording device as described above this object is achieved in that the device comprises means for deriving a signal which is indicative of the quality of the recorded information pattern, such indication signal being derived on the basis of the read signal which is supplied by the read/write head during the repeated scanning operation.

In the device according to the invention advantageous use is made of the fact that due to the periodic interruption of the recording operation extra time will become available for monitoring the recording quality on the basis of the read signal. The indication signal can be used to improve the recording quality.

In accordance with a further embodiment of the invention such an improvement can be obtained if the recording device comprises means for adapting, in dependence upon the indication signal, the write parameter which influences the relation between the information to be recorded and the resulting recorded information pattern.

An embodiment of the recording device derives the indication signal on the basis of the number of errors in the information which has been read. Such device comprises a read circuit for regaining the recorded information from the read signal, and the means for deriving the indication signal includes means for detecting errors in the regained information and means for counting errors in the read information in accordance with a given counting criterion. The indication signal is indicative of the number of counted errors.

A further embodiment of the recording device is characterized in that it comprises means for detecting whether the indication signal satisfies a predetermined criterion, and means for storing the information associated with the last recorded information pattern. The control means repeats the recording of at least those portions of the stored information for which the indication signal does not satisfy said criterion. Due to such repeated recording, the recording quality is improved.

A further embodiment of the recording device is characterized in that it comprises means for adding error-correcting codes to the information to be recorded, the means for detecting errors being adapted to detect errors which are not correctable by the error-correcting codes, the indication signal indicating the number of uncorrectable errors. This embodiment has the advantage that a very reliable recording is obtained having only a very small number of incorrectable errors in the information which has been read.

BRIEF DESCRIPTION OF THE DRAWINGS

Further embodiments of the recording device and their advantages will hereinafter be described with reference to FIGS. 1 to 6 in which.

DESCRIPTION OF THE PREFERRED EMBODIMENTS

Figure 1:
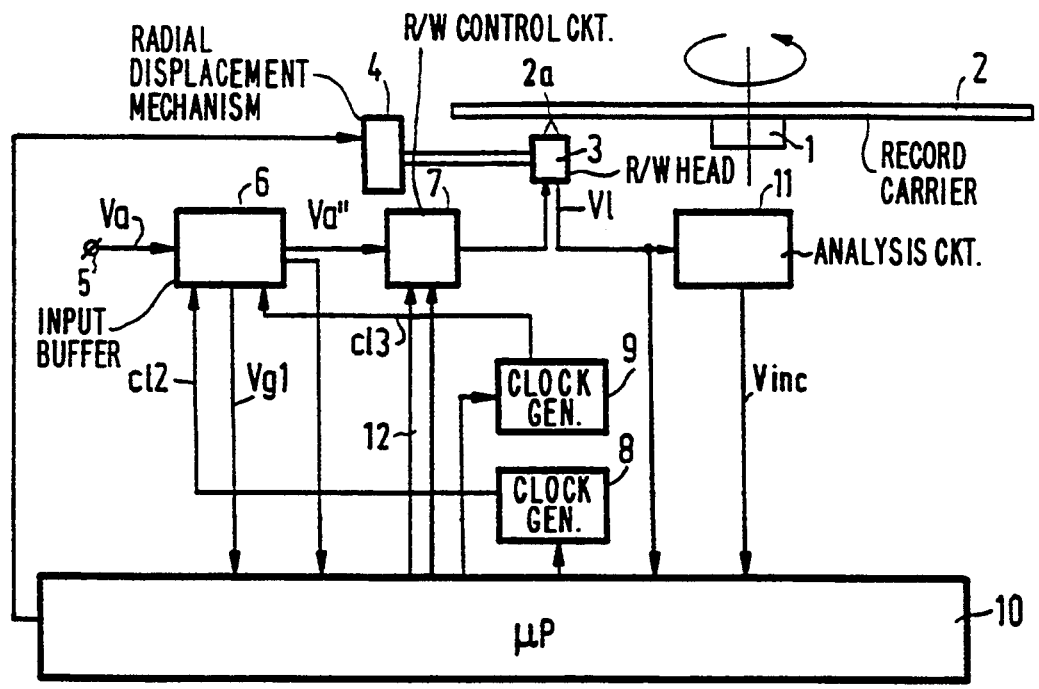
FIGS. 1 and 6 show different embodiments of the recording device according to the invention.

FIG. 1 shows a first embodiment of a device according to the invention for recording information in a recording layer of a record carrier. The device comprises a motor 1 for causing a disc-shaped record carrier 2 of an inscribable type, for example an optical record carrier, to rotate about its axis, which record carrier has a spiral track intended for recording information. A read/write head 3 scans the record carrier in accordance with a path described by a scanning point 2a the position of which is fixed by the position of the read/write head 3 relative to the rotating record carrier 2. The read/write head 3 may be, for example a conventional optical read and write head which means the record carrier 2 with a radiation beam. The device has a tracking system (not shown) of a conventional type which ensures that the scanning point 2a substantially coincides with the center of the track, The device is further provided with a focus control (not shown) for keeping the scanning beam focused on the record carrier, and a scanning speed control system (not shown) of a conventional type for controlling the speed at which the record carrier 2 is moved relative to the read/write head 3. The read/write head 3 may be radially displaced with respect to the record carrier 2 by means of a radial displacement mechanism 4.

In many instances such as, for example, in the system described in EP-A-0,429,139 or in the Mini-Disc system, the bit frequency of the information to be recorded is lower than the bit frequency of the actively recorded digitized signals as in the Compact Disc system of the RDAT system. This may be due, for example, to data compression techniques. This means that the bit frequency of the digital signal to be recorded no longer corresponds to the bit frequency of the signals for which most conventional recording and reading devices for digital information have been designed. This difference in bit frequency can be compensated during the recording operation by using an input buffer memory 6, for example a memory of the First-In-Out type (FIFO) which is arranged between an input 5 for receiving the digital signal Va to be recorded and a control circuit 7 for controlling the read/write head 3. The buffer memory 6 is loaded at a rate which corresponds to the bit frequency of the received digital signal Va, and the stored information is subsequently retrieved and supplied to a data input of the control circuit 7 at a retrieval rate which is related to the scanning rate during the recording operation. If the scanning rate is the conventional rate of 1.2-1.4 m/s, as in recording and reading of standard CD signals, a retrieval rate which corresponds to the bit frequency of the standard EFM-modulated CD signal is very suitable. The read/write head 3 can be brought to a write state via the control circuit 7, in which state the head 3, in response to the write signal supplied by the control circuit 7, records a corresponding information pattern in the scanned portion of the record carrier 2. The read/write head 3 can also be brought to a read state via the control circuit 7. The head 3 then supplies a read signal VI in accordance with the recorded information pattern in the scanned portion of the record carrier 2.

To control the loading of the input buffer memory 6, the device may comprise a clock signal generator 8 for supplying the input buffer memory 6 with a clock signal c12 related to the bit frequency of the signal Va.

The recording device may further comprise a second clock signal generator 9. The clock signal generator 9 applies a retrieval clock signal c13 to the input buffer memory 6, which signal is used for retrieving the information stored in the input buffer memory 6, said retrieval clock signal c13 having a frequency which preferably corresponds to the scanning rate during recording. In order for a limited storage capacity of the input buffer memory 6 to be sufficient, the recording can be controlled in such a way that the information stored in the input buffer memory 6 is retrieved and subsequently recorded when a given upper limit of the filling level of the input buffer memory 6 is exceeded. Retrieval and recording of information is then sustained until the filling level falls below a given lower limit, whereafter the retrieval and recording process is interrupted until the filling level has again exceeded the upper limit. For such filling level control the device comprises recording control means which consist of, for example, a programmable control unit 10 of a conventional type which is loaded with a suitable program. The control unit 10 is coupled to the radial displacement mechanism 4 for supplying a control signal thereto so as to produce a radial scanning jump across a defined number of tracks. The control unit 10 is further coupled to the clock signal generators 8 and 9 for activating and deactivating the generation of the clock signals supplied thereby. The control unit 10 also applies a control signal to the read/write control circuit 7. The control circuit 7 is responsive to the received control signal to bring the read/write head 3 to within the read state or the write state. In the read state the read/write head 3 produces a read signal VI which represents the information recorded at the scanning location in the track portion then being scanned by the read/write head 3. In the write state the information received at the data input of the control circuit 7 is recorded by the read/write head 3. The input buffer memory 6 further supplies a filling level indication signal Vg1 to control unit 10 which is indicative of the filling level of the input buffer memory 6, for the purpose of controlling the recording operation. Finally the read/write head 3 is coupled to the control unit 10 for supplying the read signal VI thereto so as to determine an address signal indicating the position of the scanning point.

Figure 3:
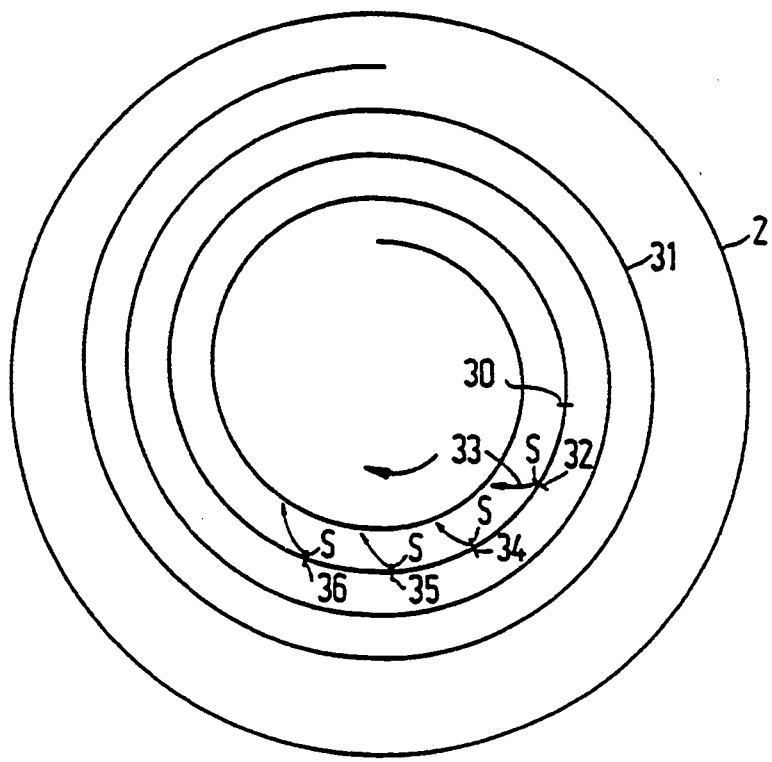
Figure 2:
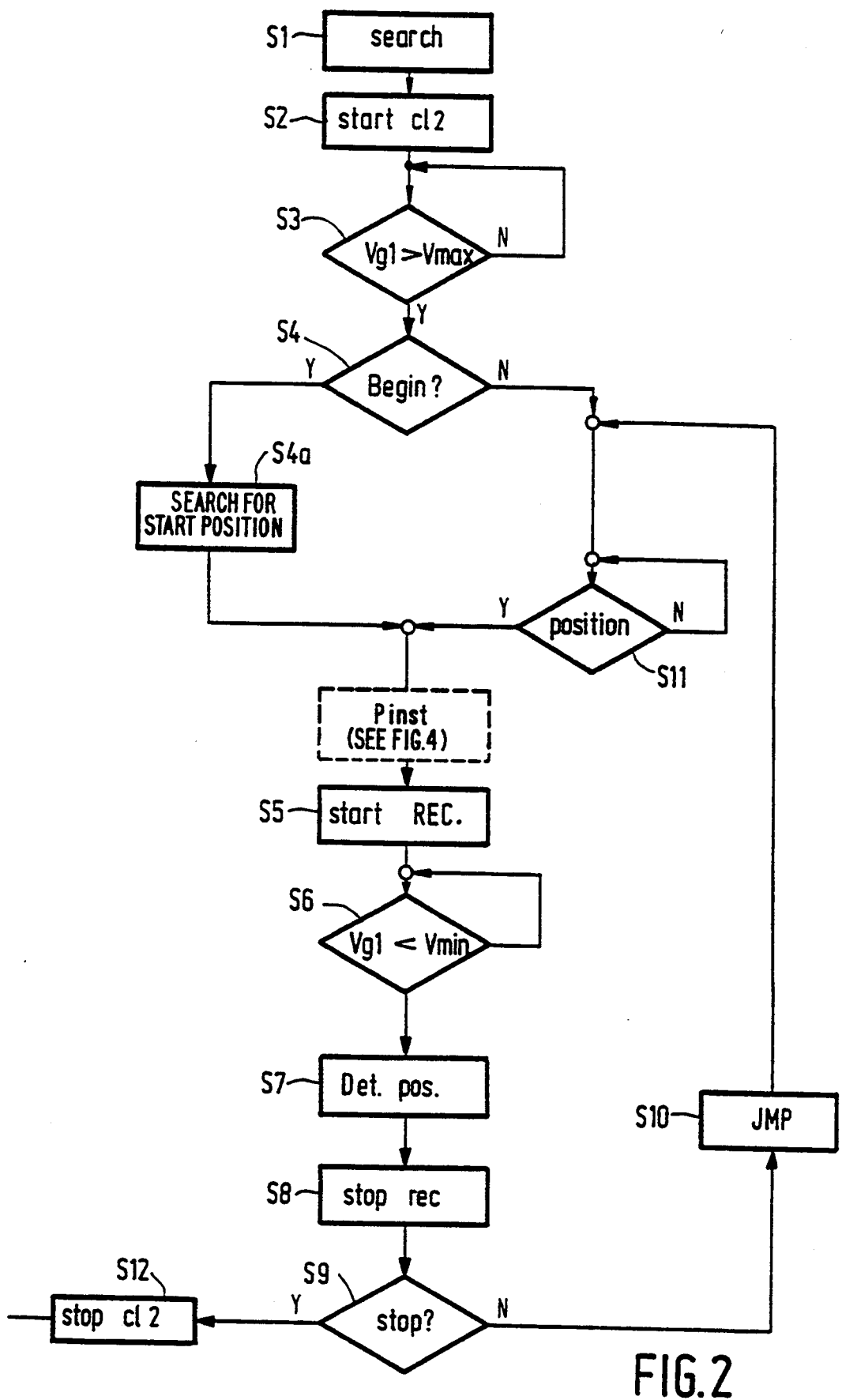
FIGS. 2, 4 and 5 show flow charts of programs performed by program-controlled control units of the recording device and, FIG. 3 is a plan view of a record carrier in which information has been recorded by a recording device according to the invention.

The control of recording will hereinafter be elucidated with reference to FIG. 2 showing a flow chart of a suitable recording control program for the control unit 10, and FIG. 3 which is a plan view of the record carrier 2 with the track present on it, denoted by the reference numeral 31.

The control program flow chart shown in FIG. 2 comprises a step S1 which is performed when it is desired to record an information signal Va supplied to the input 5. During the execution of step S1 the read/write head 3 is brought, in a conventional manner under the control of the control unit 10, to a desired radial position where the recording is to start. Subsequently a start is made, by generation of loading clock c12, of loading of the signal Va into the input buffer memory 6 during the execution of step S2. After the initiation of step S2 it is ascertained with reference to the filling level indication signal Vg1 during the execution of step S3 whether the filling level of the input buffer memory 6 has exceeded a given value Vmax. As soon as the filling level has exceeded this value, it is tested in step S4 whether the information stored in the input buffer memory 6 relates to the first packet of the information to be recorded. If positive, a search is made on the track where the recording operation can start during the execution of step S4a and in a way as described, for example, in published European Patent Application EP-A-0 325 329 which is herein incorporated by reference. Subsequently the recording operation is started during the execution of step S5. During the execution of step S5 the generation of the retrieval clock signal c13 is activated so that the information stored in the input buffer memory 6 is applied to the control circuit 7 in synchronism with the retrieval clock signal c13. During the execution of step S5 the read/write head 3 is also set to the write state, with the result that the information applied to the control circuit 7 is recorded. For the purpose of illustration, the reference numeral 30 in FIG. 3 indicates the point where recording in the spiral track 31 begins.

The rate at which the information is retrieved from the input buffer memory 6 is higher than the rate at which the input buffer memory 6 is loaded, and the filling level of the input buffer memory 6 will decrease during recording. In step S6 it is tested whether the filling level of the input buffer memory falls below a given limit Vmin. If positive, the location in the track where the recording will be interrupted is determined during step S7. Moreover, information indicating this location is stored, for example, in a memory (not shown) within the control unit 10. For a detailed description of filling level control reference is made to the previously mentioned published application EP-A-0.429.139 which corresponds to U.S. Pat. No. 5,212,678. During the execution of step S8 the read/write head 3 is set to the read mode at the instant when the position is reached where the recording must be interrupted, and simultaneously the retrieval of the information from the input buffer memory 6 is interrupted by deactivating the generation of the retrieval clock signal c13. In FIG. 3 the point at which the recording in the track 31 is interrupted is denoted by the reference numeral 32. After the execution of step S8 it is determined during step S9 whether all information packets have already been recorded. If negative, step S10 is carried out in which the read/write head jumps over one or more tracks to a turn of the spiral track preceding the track portion in which the recording was interrupted. The jump is denoted by arrow 33 in FIG. 3. As a result of the radial jump the track portion located before the point 32 where the recording was interrupted is scanned. During the execution of step S11 it is tested with reference to the read signal VI whether the point 32 has been reached again, for example, on the basis of the address information present in the track. If so, the recording operation is resumed by performing step S5. During recording the recording operation is temporarily interrupted at the positions in the track 31 denoted by the reference numerals 33, . . . ,36. This process of interrupting and resuming the recording operation continues until in step S9 the last packet of information to be recorded is detected and step S12 is carried out. During the execution of step S12 the loading of the digitized information in the input buffer memory 6 is stopped by deactivating the load clock signal c12.

The embodiment of the recording device according to the invention shown in FIG. 1 comprises an analysis circuit 11 for deriving, from the read signal VI, an indication signal Vinc which is indicative of the quality of the read signal VI. The indication signal may indicate whether a given write parameter such as, for example the write power, deviates from an optimum write power. If the information to be recorded has a duty cycle of 50%, an analysis circuit may be used which determines the duty cycle of the read signal. When recording a d.c.-free signal, the analysis circuit 11 may be a circuit for determining the d.c. component of the read signal. However, analysis circuits of other types are also usable, for example the analysis circuits as described in the published German Patent Application WO 91/09399, EP-A-0,404,205, EP-A-0.404,247, and EP-A-0.442,566, which are herein incorporated by reference. The indication signal Vinc is used for adapting the write parameter. This may be effected, for example by means of a suitable hardwired circuit. In the embodiment shown in FIG. 1 the indication signal is applied to the control unit 10 which is loaded with a suitable setting program setting, via a signal line 12, a write parameter such as, for example the write power set by the control circuit 7 in dependence upon the indication signal and in a conventional manner, as described, for example in the aforementioned published Patent Applications EP-A-0,404,247, EP-A-0,404,251 and EP-A-0,442,566.

Figure 4:
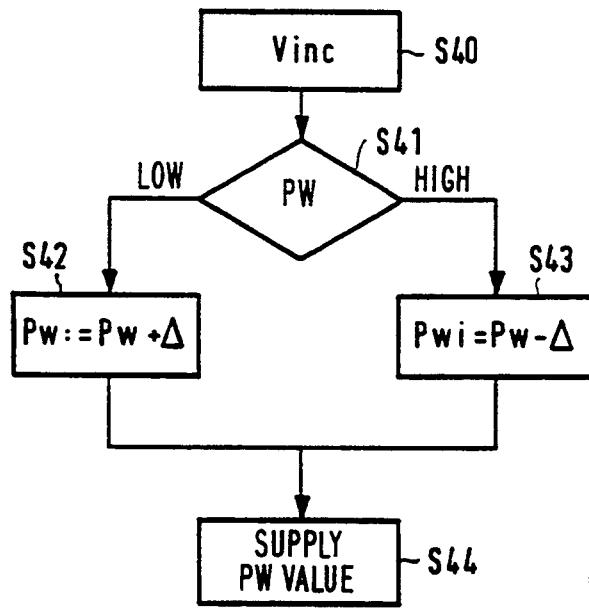

FIG. 4 shows by way of example a flow chart of a suitable write parameter control program. This program may be performed, for example, before the program step S5 to start recording is performed. For the purpose of illustration this write parameter control program is indicated by Pinst in the flow chart of FIG. 2.

The program Pinst comprises a step S40 in which the indication signal Vinc is written. In step S41 it is determined on the basis of the written indication signal Vinc whether the write power PW which has been set is too high or too low. If the indication signal Vinc indicates that the write power which has been set is too low, step S42 is carried out in which a setting value PW is raised by an adaptation value. However, if it is apparent during the execution of step S41 that the write power which has been set is too high, the setting value is lowered by the adaptation value during the execution of step S43. During the execution of step S44 the setting value PW is supplied to the control circuit 7 which sets the write power at a level fixed by the setting value PW.

Figure 5:
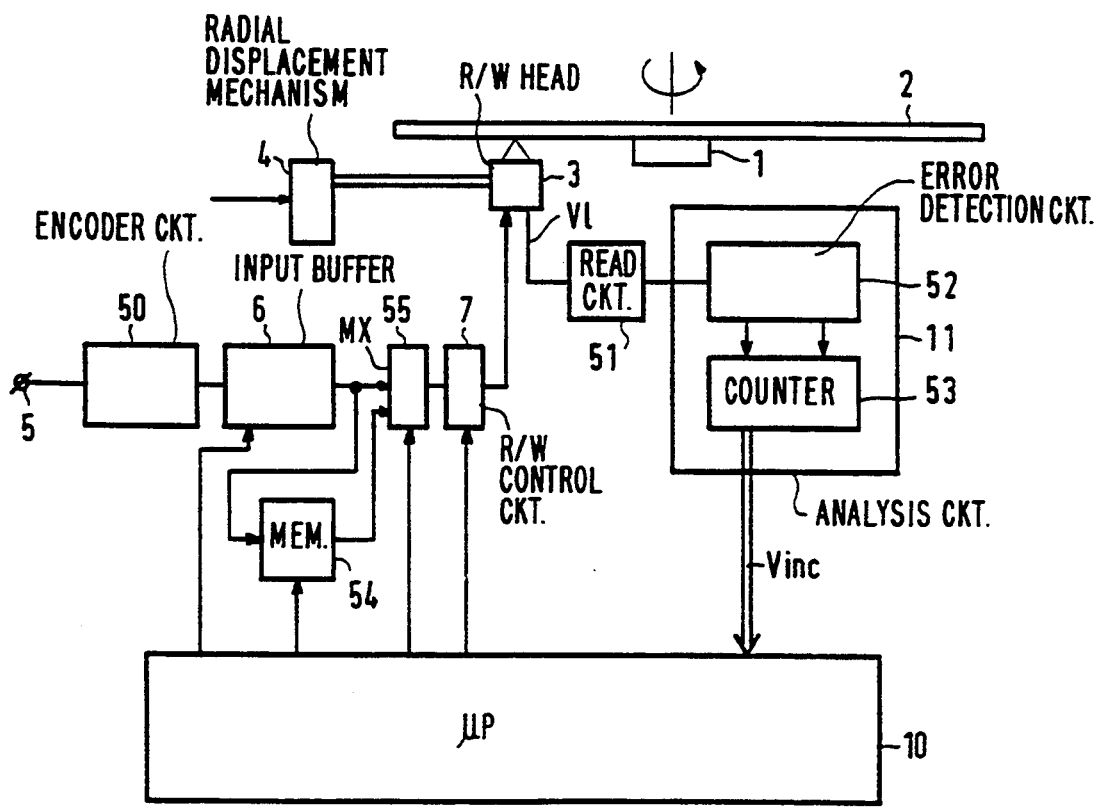

FIG. 5 shows a further embodiment of the recording device according to the invention. The components of the device corresponding to components already described with reference to FIG. 1 have the same reference numerals.

The signal path between the input 5 and the control circuit 7 incorporates a signal encoding circuit 50 which adds error-correcting codes in a conventional manner to the information signal to be recorded. Such a signal encoding circuit may be, for example of a type as is generally used for recording digital signals in accordance with a CD standard. In the embodiment described the signal processing encoding 50 is arranged between the input 5 and the input buffer memory 6. However, the circuit 50 may also be arranged in the signal path between the input buffer memory 6 and the read/write control circuit 7. The read signal VI is applied to a read circuit 51 of a conventional type for regaining the recorded information. The output of the read circuit 51 is applied to an error detection circuit 52 of a conventional type. The error detection circuit may be adapted to detect errors on the basis of the error correcting codes added to the information. The error detection circuit 52 is coupled to a counting circuit 53 for counting the errors detected by the error detection circuit 52 in accordance with a given criterion. Such a criterion may be, for example the Block Error Rate as is conventionally used for testing the quality of CD signals which have been read. For a detailed description of a device for counting these errors reference is made, for example to U.S. Pat. No. 4,665,513, which is herein incorporated by reference. However, other counting criteria from those described in said document are also usable. The counting circuit 53 produces an indication signal Vinc signifying the number of detected errors. The counting circuit 53 and the error detection circuit 52 jointly constitute an embodiment of the circuit 11 for deriving the indication signal Vinc.

The number of errors indicated by the signal Vinc indicates the quality of the recorded information pattern. If such number exceeds a predetermined number, it is desirable to repeat the recording of this information pattern in an additional recording cycle. In the device according to the invention, in which recording is periodically interrupted to fill the input buffer memory 6, the repeated recording operation may be carried out during a period in which retrieval of information from the input buffer memory 6 is interrupted.

However, it is then necessary for the information being recorded to be temporarily stored after recording thereof, until the time interval has elapsed in which the repeated recording of such information is possibly is to take place. For this purpose the embodiment shown in FIG. 5 is provided with an additional memory 54 to which is supplied the information to be recorded upon retrieval thereof from the input buffer memory 6.

Figure 6:
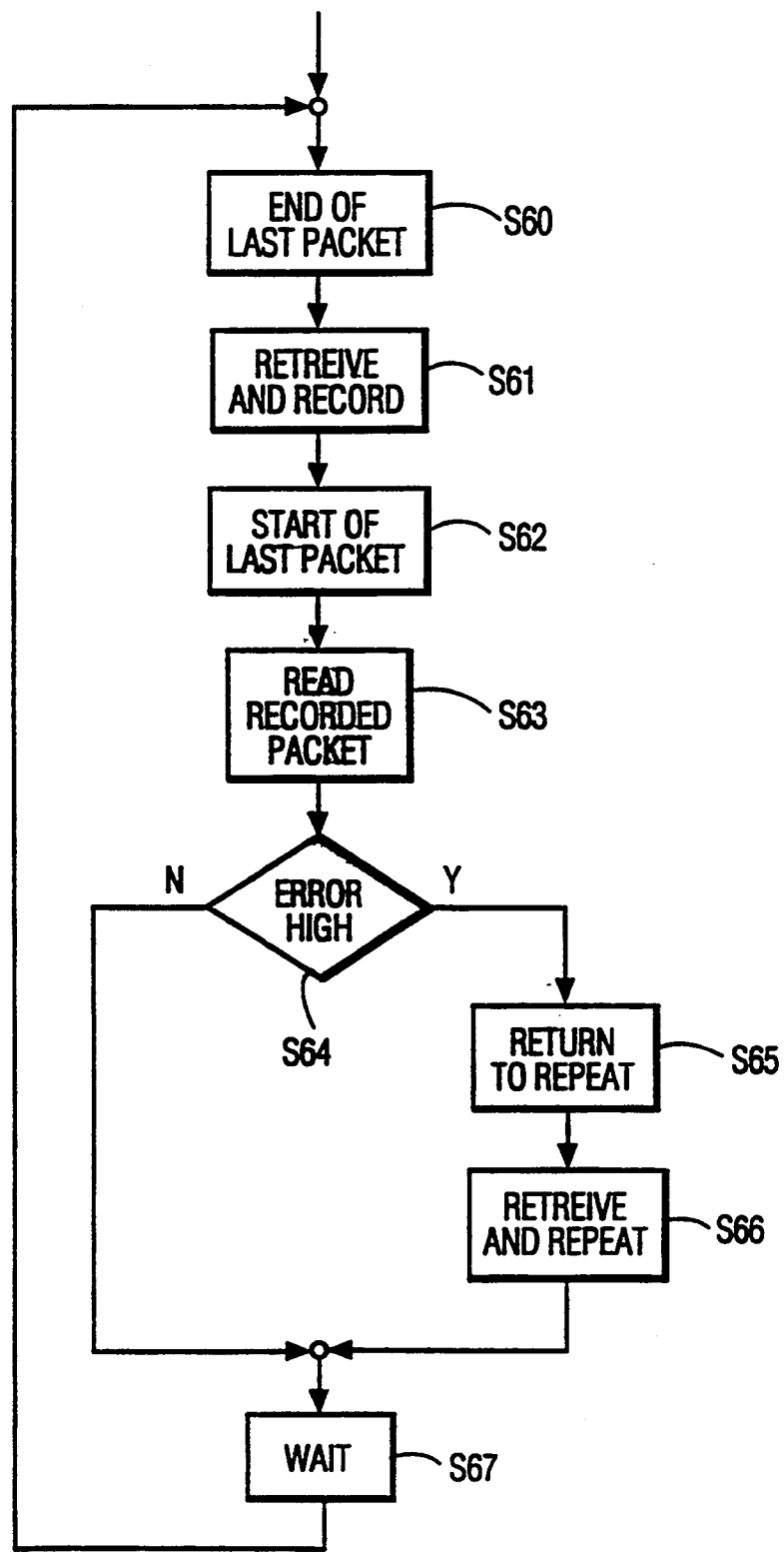

The output of the buffer memory 6 and of the additional memory 54 are respectively connected to respective inputs of a two-port multiplex circuit 55. The output of the multiplex circuit 55 is coupled to the input of the control circuit 7. Under the control of the control unit 10 one of the inputs of the multiplex circuit 55 may be selectively interconnected to its output. The process of loading and retrieval of information from the input buffer memory 6 and the additional memory 54 is conventionally controlled by the control unit 10. A flow chart of a program to be performed by the control unit 10 for controlling repeated recording is shown in FIG. 6.

Step S60 is a step in which the scanning point is displaced under the control of control unit 10 towards the track portion where the end of the last recorded packet of information is located. As soon as this position is reached, step S61 is performed in which a packet of information is retrieved from the input buffer memory and applied to the control circuit 7 via the multiplex circuit 55. Simultaneously, the read/write head 3 is brought to the write state via the control circuit 7 so that an information pattern corresponding to the retrieved information is recorded in the scanned portion of the track 31. Furthermore, the additional memory 54 is controlled during the execution of step S61 in such a way that the packet of information retrieved from the input buffer memory 6 is stored in the memory 54. After the retrieved packet has been recorded, step S62 is carried out. Under the control of the control unit 10 the scanning point is brought to the point in the track where the recording of the last recorded packet was started.

As soon as this point has been reached, the recorded information is read during the execution of step S63, while the number of erroneously read information units is detected by the error detection circuit 52. These detected errors are counted by the counting circuit 53. The signal Vinc indicating a number of errors counted in accordance with a given criterion is passed on to the control unit 10.

In step S64 it is ascertained on the basis of the signal Vinc whether the number of detected errors is so high that a repeated recording operation is desired. If positive, step S65 is performed. In this step the scanning point jumps to the point on the track 31 where the recording of the last recorded packet was started. As soon as this point is reached, step S66 is carried out. In this step the last packet stored in the memory 54 is retrieved under the control of the control unit 10 and applied to the control circuit 7 via the multiplex circuit 55. Simultaneously, the read/write head 3 is brought to the write state via the control circuit 7.

As soon as the resumed recording operation is finished, the program is continued with step S67. In this step a waiting time is observed until sufficient information is present in the input buffer memory 6 to record a subsequent packet of information. Subsequently step S60 is carried out again. If it has appeared during the execution of step S64 that resumed recording is not necessary, step S64 is not followed by step S65, but step S67 is performed directly.

The criterion used in the above-mentioned embodiment for determining whether a resumed recording operation is desirable may imply, for example that the number of errors per information block should not exceed a predetermined value. As a result of the added error-correcting codes the majority of the detected errors may generally be corrected. Such errors are not fatal, in contrast to errors which are not correctable. It is therefore preferred to have the decision whether a resumed recording operation is to take place depend on the number of detected incorrectable errors. The detection of incorrectable errors may be realized in a similar manner as is common practice in reading Compact Discs.

The invention has been described with reference to a recording system for rotating disc-shaped record carriers. However, it should be noted that the use of the invention is not limited to recording and reading of rotating disc-shaped record carriers. In principle, the invention may be used in any recording and reading system in which it is possible to scan and re-record a previously located portion of the track. The use of the invention is also not limited to optical recording and reading systems, but may also be used in magnetic recording and reading systems.

It is further to be noted that the decision criteria based on which the recording and/or reading operation is interrupted and resumed are not limited to the decision criteria described. For example, the decision criteria as described in published application WO 91/11002 are also usable. It is further possible, for example, to interrupt the recording and/or reading operation each time after reading or recording information from in an integral number of turns of the spiral track. It is also possible, for example to resume the recording and/or reading operation when a minimum time interval has elapsed. It is always essential, however, that the storage capacity be sufficiently large to compensate for occurring fluctuations in the quantity of stored information and that the available time between two recording cycles of the recording operation is sufficient to scan the last recorded information packet at least partly for the purpose of having the indication signal Vinc. In the embodiment shown in FIG. 5 it is important that the available time between two recording cycles is sufficient to read and re-record the last already recorded packet.

I claim:

1. A device for recording information on a recording track of a record carrier at a rate greater than that at which the information is received, said device comprising:

a read and write head for producing a scanning spot at a position on the recording track determined by the position of the read and write head relative to the record carrier;

scanning means for translating the read and write head so that the scanning spot scans along the recording track;

said read and write head being adapted to be selectively set to either of a write state and a read state, in the write state being responsive to a write signal supplied thereto to record an information pattern corresponding to said write signal in the portion of the recording track then being scanned, and in the read state producing a read signal corresponding to a recorded information pattern in the portion of the recording track then being scanned;

an input buffer memory for successively receiving and temporarily storing successive packets of the information to be recorded;

buffer control means for retrieving the stored information packets from the input buffer at a rate higher than the rate at which they are received in the input buffer;

a write control circuit coupled to said read and write head and to the input buffer for receiving each packet of information retrieved from the input buffer, converting said packet into a write signal, supplying said write signal to said read and write head, and setting said read and write head to said write state so as to record said write signal as an information pattern on said recording track;

system control means coupled to said read and write head, said write control circuit, said scanning means and said buffer control means, said system control means being programmed to:

(i) cause said buffer control means to interrupt retrieval of stored information packets from the input buffer during periodic interruption intervals so as to maintain a filling level of the input buffer between predetermined limits;

(ii) during each retrieval interruption interval cause said write control circuit to set the read and write head to the read state and cause said scanning means to return the read and write head to again scan the portion of the recording track wherein the last information packet already retrieved from the input buffer has been recorded and produce a read signal corresponding to said last recorded information packet; and (iii) upon completion of each retrieval interruption interval, cause said write control circuit to return the read and write head to the write state and cause said buffer control means to resume retrieval of packets of information from the input buffer, so that recording of succeeding packets of information is resumed; and analysis circuit means coupled to said read and write head to receive the read signals produced thereby during said retrieval interruption intervals, and derive from said read signals a signal indicative of the quality of the recorded information patterns produced on said track during recording, whereby the retrieval interruption intervals for maintaining a predetermined filling level of the buffer memory are also utilized to derive an indication of the quality of the recorded information patterns produced during recording.

2. A recording device as claimed in claim 1, characterized in that said system control means receives said indication signal from said analysis circuit means and based thereon adjusts a write parameter applicable to said write control circuit and said read and write head which influences the relationship between information being recorded and the recorded information pattern produced therefrom.

3. A recording device as claimed in claim 1, further comprising a read circuit coupled to said read and write head for receiving the read signal produced thereby during a recording interruption, regaining from said read signal the information represented thereby, and supplying the regained information to said analysis circuit; and wherein said analysis circuit comprises means for detecting errors in the regained information and means for counting said errors in accordance with a predetermined counting criterion, the indication signal produced by said analysis circuit being indicative of the number of counted errors.

4. A recording device as claimed in claim 3, further comprising storage means coupled to said input buffer for storing the last packet of information retrieved therefrom prior to a recording interruption; said system control means being adapted to control said scanning means and said write control circuit so as to cause the read and write head to record at least a portion of the packet of information stored in said storage means when said indication signal signifies that the quality of the portion of the recorded information pattern corresponding to said portion of information packet fails to conform with a predetermined criterion.

5. A recording device as claimed in claim 3, further comprising means for adding an error-correcting code to the information to be recorded, and wherein said means for detecting errors is adapted to detect errors which are not correctable by means of said error-correcting code, the indication signal produced by said analysis circuit being indicative of the number of said incorrectable errors.

* * * * *